United States Patent
Wang et al.

(10) Patent No.: US 10,759,947 B2
(45) Date of Patent: Sep. 1, 2020

(54) AQUEOUS COATING COMPOSITION AND PROCESS OF MAKING THE SAME

(71) Applicants: Dow Global Technologies LLC, Midland, MI (US); Rohm and Haas Company, Collegeville, PA (US)

(72) Inventors: Caifeng Wang, Shanghai (CN); Jianming Xu, Shanghai (CN); Yujiang Wang, Shanghai (CN); Yunfei Lan, Shanghai (CN)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 110 days.

(21) Appl. No.: 15/774,094

(22) PCT Filed: Dec. 14, 2015

(86) PCT No.: PCT/CN2015/097231
§ 371 (c)(1),
(2) Date: May 7, 2018

(87) PCT Pub. No.: WO2017/100969
PCT Pub. Date: Jun. 22, 2017

(65) Prior Publication Data
US 2019/0169442 A1    Jun. 6, 2019

(51) Int. Cl.
| | | |
|---|---|---|
| C09D 5/22 | (2006.01) |
| C09D 5/02 | (2006.01) |
| C08F 220/14 | (2006.01) |
| C08F 220/18 | (2006.01) |
| C08F 2/00 | (2006.01) |
| C08F 2/24 | (2006.01) |
| C09D 133/10 | (2006.01) |
| C08F 2/44 | (2006.01) |
| C09D 7/61 | (2018.01) |
| C09D 133/06 | (2006.01) |

(52) U.S. Cl.
CPC .............. *C09D 5/022* (2013.01); *C08F 2/001* (2013.01); *C08F 2/24* (2013.01); *C08F 2/44* (2013.01); *C08F 220/14* (2013.01); *C08F 220/18* (2013.01); *C09D 5/024* (2013.01); *C09D 7/61* (2018.01); *C09D 133/064* (2013.01); *C09D 133/10* (2013.01)

(58) Field of Classification Search
CPC ....................................................... C09D 5/022
See application file for complete search history.

(56) References Cited

U.S. PATENT DOCUMENTS

| | | | |
|---|---|---|---|
| 2,630,410 | A | 3/1953 | Clapsadle et al. |
| 3,966,572 | A | 6/1976 | Carder |
| 5,368,833 | A | 11/1994 | Johansson et al. |
| 6,210,790 | B1 | 4/2001 | Crivello |
| 6,586,171 | B1 * | 7/2003 | Iwado ................ F26B 13/006 430/531 |
| 6,586,502 | B2 | 7/2003 | Wallace et al. |
| 2005/0203211 | A1 * | 9/2005 | Gebhard ............ C08F 265/06 523/205 |
| 2009/0041942 | A1 | 2/2009 | Hayashi et al. |
| 2014/0256871 | A1 * | 9/2014 | Wang ................ C09D 133/26 524/555 |

FOREIGN PATENT DOCUMENTS

| | | |
|---|---|---|
| EP | 2586836 A1 | 5/2013 |
| JP | 3289700 B2 | 6/2002 |
| WO | 2013056464 A1 | 4/2013 |
| WO | 2013072769 A1 | 5/2013 |
| WO | 2013174894 A1 | 11/2013 |

OTHER PUBLICATIONS

European Search Report for the corresponding Application No. EP15910443; dated Apr. 7, 2019; 6 pages.
Iler, K. Ralph; The Chemistry of Silica, John Wiley & Sons, pp. 407-409.

* cited by examiner

*Primary Examiner* — Hai Y Zhang
(74) *Attorney, Agent, or Firm* — Karl E. Stauss; Cantor Colburn LLP

(57) ABSTRACT

The present invention provides a novel aqueous coating composition comprising a multi-stage aqueous emulsion polymer, an anionic colloidal silica, and a thickener. This novel aqueous coating composition provides low gloss, while maintaining good physical stability and transparency.

13 Claims, No Drawings

AQUEOUS COATING COMPOSITION AND PROCESS OF MAKING THE SAME

FIELD OF THE INVENTION

The present invention relates to an aqueous coating composition and a process of making such aqueous coating composition.

INTRODUCTION

Clear top coat compositions are commonly applied to painted substrates as an additional finishing layer. Application of clear top coat layers is especially prevalent on exterior surfaces such as exterior building walls, exterior flooring, and automotive parts. The primary purpose for applying a clear top coat layer is to provide a colorless "invisible" protective layer to guard the painted surface against physical and chemical weathering effects (such as moisture, ultraviolet light, and dusting, etc.). However, it has been observed that, after applying clear top coats to painted surfaces, the coated surfaces tend to become undesirably glossy when exposed to light, thereby creating an unintended glaring effect that negatively impacts the aesthetic appearance of the underlying painted surface.

The conventional approach to reduce such undesirable glossy effect in top coat compositions is to add micro-fillers, such as porous silica or pigments, as matting agents into the clear top coat composition. Such matting agents provide additional surface roughness to a coated surface, so as to disperse light reflection and therefore reduce its reflective effect. However, adding matting agents tend to negatively impact the physical stability of the top coat composition. Specifically, matting agents such as micro-fillers tend to precipitate and form visible settlement layers within the top coat layer. These micro-filler layers reduce clarity of the coated surfaces.

Therefore, it is desirable to provide a top coat composition that provides the finished surface with low gloss, while maintaining acceptable transparency and good physical stability.

SUMMARY OF THE INVENTION

Inventors of the present invention have surprisingly discovered a novel aqueous coating composition. Among other applications, this novel aqueous coating composition can be used as a clear top coat that not only provides low gloss after being applied to a painted surface, but also exhibits good physical stability and transparency. More specifically, inventors of the present invention discovered, through a series of experimentations, that combining certain high molecular weight multi-stage aqueous emulsion polymer, anionic colloidal silica, and a certain type of thickener, in particular portions, process conditions and steps, would result in an aqueous coating composition that, when applied to a painted substrate, results in having a low gloss number (i.e., 20 or less on a 60° Gardner Gloss scale), a good transparency level (i.e., a L* value of no more than 30 measured on a BYK Gardner Color-guide Sphere Spectrophotometer), and good physical stability (i.e., no formation of precipitation layers in cross sections of the coating composition).

In a first aspect, the present invention is an aqueous coating composition comprising, a multi-stage aqueous emulsion polymer comprising: from 20% to 80% by weight, based on the dry weight of the multi-stage aqueous emulsion polymer, of a first polymer having an acid number of from 9.81 to 32.7, said first polymer having a calculated molecular weight of from 50000 to 1000000; and from 80% to 20% by weight, based on the dry weight of said multi-stage aqueous emulsion polymer, of a second polymer having an acid number from 0 to 6.54, said second polymer having a calculated molecular weight of from 50,000 to 1,000,000; an anionic colloidal silica; and a thickener.

In a second aspect, the present invention is a method for providing a coating comprising, forming an aqueous coating composition comprising (1) a multi-stage aqueous emulsion polymer comprising: from 20% to 80% by weight, based on the dry weight of the multi-stage aqueous emulsion polymer, of a first polymer having an acid number of from 9.81 to 32.7, said first polymer having a calculated molecular weight of from 50,000 to 1,000,000; and from 80% to 20% by weight, based on the dry weight of said multi-stage aqueous emulsion polymer, of a second polymer having an acid number from 0 to 6.54, said second polymer having a calculated molecular weight of from 50,000 to 1,000,000; (2) an anionic colloidal silica; and (3) a thickener; applying the aqueous coating composition to a substrate; and drying, or allowing to dry, said applied aqueous coating composition.

DETAILED DESCRIPTION OF THE INVENTION

In one embodiment of the present invention, the aqueous coating composition of the present invention comprises at least one multi-stage aqueous emulsion polymer. This multi-stage aqueous emulsion polymer includes, from 20% to 80%, preferably from 40% to 70% by weight, based on the dry weight of the multi-stage aqueous emulsion polymer, of a first polymer having an acid number from 9.81 to 32.7 mg KOH per gram of dry polymer, preferably from 13.08 to 26.16. The first polymer has a calculated number average molecular weight ("Mn") of from 50,000 to 1,000,000, and a glass transition temperature ("Tg") of no more than 50° C. This multi-stage aqueous emulsion polymer also includes from 80% to 20%, preferably from 30% to 60% by weight, based on the dry weight of the multi-stage aqueous emulsion polymer, of a first polymer having an acid number from 0 to 6.54, preferably from 0 to 5.23. The second polymer has a calculated number average molecular weight ("Mn") of from 50,000 to 1,000,000, and a glass transition temperature ("Tg") of no more than 100° C.

Here, by "multi-stage aqueous emulsion polymer," it means an emulsion polymer prepared by the sequential addition of two or more different polymer compositions. By "first polymer" and "second polymer," they mean two polymers having the same or different compositions regardless of the order in which they were prepared in a multi-stage emulsion polymerization process. The "first polymer" means the aqueous emulsion polymer that is formed first. The "second polymer" means the aqueous emulsion polymer that is formed in the presence of the first polymer. Note that neither the weight nor composition of any seed polymer or any additional stage(s) polymer shall be included in the weight, composition, acid number, or calculated Tg of the first polymer or the second polymer.

In some embodiments of the present invention, the first polymer and the second polymer of the multi-stage aqueous emulsion polymer each typically include at least one nonionic copolymerized ethylenically unsaturated monomer such as, for example, a (meth)acrylic ester monomers such as methyl acrylate, ethyl acrylate, butyl acrylate, 2-ethylhexyl acrylate, nonyl acrylate, decyl acrylate, lauryl acrylate, hydroxyethyl acrylate, hydroxypropyl acrylate, methyl methacrylate, ethyl methacrylate, butyl methacrylate, nonyl methacrylate, isodecyl methacrylate, lauryl methacrylate, hydroxyethyl methacrylate, and hydroxypropyl methacrylate; (meth)acrylonitrile ureido-functional (meth)acrylates and acetoacetates, acetamides or cyanoacetates of (meth) acrylic acid; styrene and substituted styrenes; butadiene; monoethylenically unsaturated acetophenone or benzophenone derivatives; ethylene, propylene, and 1-decene; vinyl acetate, vinyl butyrate, vinyl versatate and other vinyl esters; vinyl monomers such as vinyl chloride and vinylidene chloride; or mixtures thereof. Note that the use of the term "(meth)" followed by another term such as "(meth)acrylate" or "(meth) acrylamide," as used here, refers to both "acrylates" or "acrylamides" and "methacrylates" and "methacrylamides," respectively.

In some embodiments of the present invention, the first polymer and the second polymer of the multi-stage aqueous emulsion polymer may further comprise, as copolymerized units, one or more ethylenically unsaturated anionic monomers. These "ethylenically unsaturated anionic monomers" include, for example, polymerizable acids, anhydrides, and the metal ion (for example, Li, Na, K, Ca) and ammonium ion salts thereof. Examples of suitable polymerizable ethylenically unsaturated anionic monomers include acrylic acid, methacrylic acid, itaconic acid, phosphoethyl methacrylate, vinyl phosphonic acid, allyl phosphonic acid, fumaric acid, maleic acid, monomethyl itaconate, monomethyl fumarate, monobutyl fumarate, maleic anhydride, 2-acrylamido-2-methyl-1-propanesulfonic acid, sodium salt of 2-acrylamido-2-methyl-1-propanesulfonic acid, ammonium salt of 2-acrylamido-2-methyl-1-propane sulfonic acid, sodium vinyl sulfonate, sodium salt of allyl ether sulfonate, and the like, and mixtures thereof. In some preferred embodiments, acrylic acid, methacrylic acid, itaconic acid, 2-phosphoethyl methacrylate, or a mixture thereof is used as the ethylenically unsaturated anionic monomer.

The emulsion polymer useful in the present invention may further comprise, as copolymerized units, one or more ethylenically unsaturated monomers having one or more functional groups as self-crosslinking agents. The functional groups may be selected from carbonyl, acetoacetate, alkoxysilane, ureido, amide, imide, amino group, or mixtures thereof. Preferably, an ethylenically unsaturated monomer bearing a carbonyl group such as diacetone acrylamide is used.

As discussed above, in one embodiment of the present invention, the first polymer of the multi-stage aqueous emulsion polymer has an acid number of from 9.81 to 32.7, preferably from 13.08 to 26.16. The second polymer has an acid number of from 0 to 6.54, preferably from 0 to 5.23. These acid numbers were calculated by determining the number of milliequivalents of acid per gram in the polymer based on the copolymerized mono-ethylenically unsaturated acid monomer in the first polymer, and multiplying by the molecular weight of potassium hydroxide. The acid number unit is milligram KOH per gram dry polymer weight. Acid monomers include carboxylic acid monomers such as, for example, acrylic acid, methacrylic acid, crotonic acid, itaconic acid, fumaric acid, maleic acid, monomethyl itaconate, monomethyl fumarate, monobutyl fumarate, and malei anhydride; and sulfur and phosphorous-containing acid monomers. Preferred acid monomers for copolymerization into the first polymer and the second polymer, independently, are carboxylic acid monomers. More preferred monomers are (meth)acrylic acid.

The calculated glass transition temperature ("Tg") of the polymers are calculated by using the following "Fox equation" well known to a person of ordinary skill in the chemical art:

$$\frac{1}{T_g(calc.)} = \frac{w(M_1)}{T_g(M_1)} + \frac{w(M_2)}{T_g(M_2)},$$

Wherein, Tg(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $Tg(M_1)$ is the glass transition temperature of the homopolymer of $M_1$, and $Tg(M_2)$ is the glass transition temperature of the homopolymer of $M_2$, all temperatures being in K. The glass transition temperatures of monomers may be found, for example, in "Polymer Handbook", edited by J. Brandrup and E. H. Immergut, Interscience Publishers. In certain embodiments of the present invention, the calculated Tg of the first polymer is from −36° C. to 50° C., preferably from −10° C. to 40° C. The calculated Tg of the second polymer, on the other hand, is from 30° C. to 100° C., preferably, from 40° C. to 83° C.

In one embodiment of the present invention, the calculated number average molecular weight, ("Mn,") of the first polymer is from 50,000 to 1,000,000, preferably from 100,000 to 800,000. The calculated Mn of the second polymer is also from 50,000 to 1,000,000, preferably from 100,000 to 800,000.

In the multi-stage emulsion polymerization process, at least two different polymers are formed in sequential fashion. In accordance with one embodiment of the present invention, a multi-stage emulsion polymerization process took place in which the second polymer is formed by emulsion polymerization in the presence of the first emulsion polymer. The weight of the first polymer is from 20% to 80%, preferably from 40% to 70%, of the total dry weight of the multi-stage aqueous emulsion polymer. The weight of the second polymer is from 20% to 80%, preferably from 30% to 60%, of the dry weight of the multi-stage aqueous emulsion polymer.

In one embodiment of the present invention, conventional surfactants may be used such as, for example, anionic and/or nonionic emulsifiers such as, for example, alkali metal or ammonium alkyl sulfates, alkyl sulfonic acids, fatty acids, and oxyethylated alkul phenols. The amount of surfactant used is usually 0.1% to 6% by weight, based on the weight of monomers used to form the aqueous emulsion polymer.

In certain embodiments of the present invention, either thermal or redox initiation process may be used as part of the polymerization process. Examples of suitable free radical initiators include hydrogen peroxide, sodium peroxide, potassium peroxide, t-butyl hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of monomers.

Redox systems comprising the above described initiators coupled with a suitable reductant may also be used in the emulsion polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, glycolic acid, glyoxylic acid hydrate, lactic acid, glyceric acid, malic acid, tartaric acid and salts of the preceding acids. Redox reaction catalyzing metal salts of iron, copper, manganese, silver, platinum, vanadium, nickel, chromium, palladium, or cobalt may be used.

Furthermore, the monomer mixture for a stage may be added "neat" (i.e., without pre-mixing with any other solvents such as water), or as an emulsion in water. The monomer mixture for a stage may be added in a single addition, in multiple additions, or continuously over the reaction period allotted for that stage using a uniform or varying composition. Other additives such as, for example, free radical initiators, oxidants, reducing agents, neutralizers, and dispersants may be added prior to, during, or subsequent to the polymerization reaction.

In certain embodiments, neutralizers can be added to the aqueous emulsion polymer during or after the reaction period to control pH. Neutralizers can be selected from mineral bases such as sodium hydroxide, potassium hydroxide, salts of phosphoric acid, organic amines such as, for example, alkyl hydroxylamine, and ammonia. Selection of a single neutralizer or combinations of different neutralizers generally depends on the desired balance between odor, VOC level, water sensitivity, scrub resistance, blocking resistance, etc. For certain embodiments of the present invention, combinations of ammonia and a mineral base such as potassium or sodium hydroxide were added to provide well-balanced coating properties.

In some embodiments of the present invention, to achieve high molecular weight for the aqueous emulsion polymer (i.e., Mn of over 50,000), so that the resultant polymer has the necessary physical durability suitable for top coat compositions in exterior coating applications, the aqueous emulsion polymers are substantially free of transfer agents. "Substantially free of transfer agents" means that transfer agents are not intentionally incorporated into the aqueous emulsion polymers.

A multi-stage emulsion polymerization process usually results in the formation of at least two mutually incompatible polymer compositions, thereby resulting in the formation of at least two phases. The mutual incompatibility of two polymer compositions and the resultant multiphase structure of the polymer particles may be determined in various ways known in the art. The use of scanning electron microscopy using staining techniques to emphasize the difference between the phases, for example, is such a technique. The multi-stage aqueous emulsion polymer herein is referred to as a core/shell polymer. The polymer particles include two or more phases of various geometries such as, for example, core/shell or core/sheath particles, core/shell particles with shell phases incompletely encapsulating the core, and core/shell particles with a multiplicity of cores.

In certain embodiments of the present invention, the aqueous emulsion polymer in the coating composition of the present invention may be present, by solids weight based on the total solid weight of the coating composition, in an amount of 46% to 85%, preferably from 50% to 80%, and even more preferably, from 60% to 75%.

In certain embodiments of the present invention, the aqueous coating composition further comprises anionic colloidal silica. "Anionic colloidal silica" refers to a dispersion of anionic amorphous silicon dioxide ($SiO_2$) particles, which are typically dispersed in water, suitably in the presence of stabilizing cations such as $K^+$; $Na^+$; $Li^+$; $NH_4^+$; organic cations; primary, secondary, tertiary and quaternary amines; and mixtures thereof. The surface of the anionic colloidal silica is composed mostly of hydroxyl groups with the formula of Si—O—H. Other groups may also exist including, for example, silane-diol (—Si—$(OH)_2$), silane-triol (—Si$(OH)_3$), surface siloxanes (—Si—O—Si—O—), and surface-bound water. The anionic colloidal silica usually has a pH value between 7.5 and 11.5, preferably between 8 and 11.

The anionic colloidal silica may be derived from, for example, precipitated silica, fumed silica, pyrogenic silica or silica gels, and mixtures thereof. Silica particles in the anionic colloidal silica may be modified and can contain other elements such as amines, aluminum and/or boron. Boron-modified colloidal silica particles may include those described in, for example, U.S. Pat. No. 2,630,410. Aluminum-modified colloidal silica may have an aluminum oxide ($Al_2O_3$) content of from about 0.05% to 3%, and preferably from 0.1% to 2%, by weight based on total solids weight of the anionic colloidal silica. The procedure of preparing the aluminum-modified colloidal silica is further described in, for example, "The Chemistry of Silica", by Iler, K. Ralph, pages 407-409, John Wiley & Sons (1979) and in U.S. Pat. No. 5,368,833.

Silica content of the anionic colloidal silica may be present, by weight based on the weight of the anionic colloidal silica, from 10% to 80%, from 12% to 70%, or from 15% to 60%. The silica particles in the anionic colloidal silica may have an average particle diameter ranging from about 2 to about 100 nanometers (nm), from about 3 to about 70 nm, from about 4 to about 50 nm, or from about 5 to about 40 nm. The silica particles in the anionic colloidal silica may have a specific surface area of from 20 to 800 square meters per gram ($m^2/g$), from 30 to 780 $m^2/g$, or from 50 to 750 $m^2/g$.

In some embodiments of the present invention, the anionic colloidal silica in the aqueous coating composition may be present, by solids weight based on the solid weight of the aqueous coating composition, in an amount of 10% to 53%, and preferably from 15% to 49%, more preferably from 20% to 39%. Suitable commercially available anionic colloidal silica include, for example, BINDZIL™ 215, BINDZIL™ 2040 and BINDZIL™ 40130 colloidal silica all available from Akzo Nobel, or LUDOX™ AS-40 colloidal silica available from W.R. Grace; or mixtures thereof.

The aqueous coating composition of the present invention may further comprise one or more thickeners. Examples of suitable thickeners include alkaline-based thickeners such as alkali swellable emulsions (ASE) including sodium or ammonium neutralized acrylic acid polymers, as well as hydrophobically modified alkali swellable emulsions (HASE) including hydrophobically modified acrylic acid copolymers. In some embodiments, the concentration of the thickener is, based on the dry weight of the aqueous coating composition, from 1% to 5%, preferably from 1.5% to 4.5%, or even more preferably, from 2% to 4%.

In some embodiments, the aqueous coating composition of the present invention is optionally containing silane coupling agents. "Examples of silane coupling agents include alkyl silanes such as (3-aminopropyl)triethoxysilane, gamma-glycidoxypropyltrimethoxysilane, and ethyl triethoxysilane; epoxy silane; or mixtures thereof. The content of silane coupling agents is from 0.1 to 5% by weight, based on the solid weight of the coating composition, In some embodiments of the present invention, the aqueous coating composition is substantially free of micro-fillers. "Substantially free of micro-fillers" means that the aqueous coating composition comprises less than 1% by weight of micro-fillers, based on the solid weight of the aqueous coating composition. "Micro-fillers" refers to any organic or inorganic particles have an average particle size of from 1 to 20 microns according to the ASTM E2651-10 method. Examples of micor-fillers include matting agents, pigments, fillers, or mixtures thereof "Matting agents" herein refers to any inorganic or organic particles that provide matt effects. The matting agents may be a silica, polyurea, polyacrylate, polyethylene, or polytetrafluoroethene matting agent; or mixtures thereof. The matting agent may be in the form of powders or an emulsion.

The aqueous coating composition of the present invention may further comprise one or more wetting agents. "Wetting agent" herein refers to a chemical additive that reduces the surface tension of a coating composition, causing the aqueous coating composition to more easily spread across or penetrate the surface of a substrate. Wetting agents may be polycarboxylates, anionic, or non-ionic. When present, the concentration of the wetting agent may be, by weight based on the solid weight of the aqueous coating composition, from 0.1% to 2.5%, from 0.5% to 2%, or from 1% to 1.5%.

The aqueous coating composition of the present invention may further comprise one or more defoamers. "Defoamer" refers to a chemical additive that reduces and hinders the formation of foam. Defoamers may be silicone-based defoamers, mineral oil-based defoamers, ethylene oxide/propylene oxide-based defoamers, alkyl polyacrylates, or mixtures thereof. When present, the concentration of the defoamer may be, by weight based on the solid weight of the aqueous coating composition, generally from 0.01% to 1%, from 0.05% to 0.8%, or from 0.1% to 0.5%.

The aqueous coating composition of the present invention may be prepared by techniques which are well known in the coatings art. In one embodiment, the process of preparing the aqueous coating composition of the present invention may comprise mixing the multi-stage aqueous emulsion polymer, the anionic colloidal silica, the thickener, and water. Other optional components may also be added as described above. Components in the aqueous coating composition may be mixed in any order to provide the aqueous coating composition of the present invention. Any of the above-mentioned optional components may also be added to the composition during or prior to the mixing to form the aqueous coating composition.

The process of using the aqueous coating composition of the present invention may comprise the following: applying the aqueous coating composition to a substrate and drying the applied coating composition. The aqueous coating composition of the present invention can be applied to a substrate by known means such as brushing, dipping, rolling and spraying. The coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the aqueous coating composition of the present invention has been applied to a substrate, the aqueous coating composition may be dried, or be allowed to dry, at room temperature (21-25° C.), or at an elevated temperature, for example, from 35° C. to 60° C. to form a film.

The aqueous coating composition of the present invention can be applied to, and adhered to, various substrates. Examples of suitable substrates include wood, metals, plastics, foams, stones, elastomeric substrates, glass, fabrics, or concrete. As discussed above, the aqueous coating composition of the present invention is particularly suitable for use as clear top coat for external coating applications, such as exterior walls, exterior flooring, and automotive coatings. The aqueous coating composition is particularly suitable for use as clear top coats for industrial and architectural coatings. In addition, the aqueous coating composition of the present invention can be used alone, or in combination with other coatings to form multi-layer coatings.

Examples

The following examples illustrate the advantages of the present invention. Unless otherwise stated, all conditions are standard pressure and room temperature.

Raw Materials Used

Tables 1(a)-(d) below list the representative raw materials that can be used to make the multi-stage aqueous emulsion polymers in accordance with certain embodiments of the present invention. More specifically, Table 1(a) lists the chemicals that can be used to prepare the multi-stage aqueous emulsion polymer in accordance to certain embodiments of the present invention. Table 1(a) also shows the acronyms for these chemicals, the function for each material, and the commercial supplier from which these materials could be obtained. Table 1(b) below shows the colloidal silica used to prepare the aqueous coating compositions in accordance to certain embodiments of the present invention. Table 1(c) below shows the thickeners used to prepare the aqueous coating compositions in accordance to certain embodiments of the present invention. Table 1(d) below shows the additional materials that can be added to make the aqueous coating compositions in accordance to certain embodiments of the present invention.

TABLE 1(a)

Representative List of Raw Materials Used to Make the Multi-Stage Aqueous Emulsion Copolymers

| Raw material | Function | Supplier |
|---|---|---|
| Butyl acrylate, BA | Soft monomer | Dow Chemical |
| 2-Ethylhexyl acrylate, 2-EHA | Soft monomer | Dow Chemical |
| Methyl methacrylate, MMA | Hard monomer | Dow Chemical |
| Methacrylic acid, MAA | Functional monomer | SCRC |
| Acrylic acid, AA | Functional monomer | SCRC |
| Tert-butylhydroperoxide, t-BHP | Initiator | SCRC |
| Tert-amylhydroperoxide, t-AHP | Initiator | SCRC |
| Isoascrobic acid, IAA | Reductant | SCRC |
| Ammonium persulfate, APS | Initiator | SCRC |

TABLE 1(b)

Colloidal Silica Can Be Used to Make the Aqueous Coating Compositions

| Trade Name of Colloidal Silica | Description | Supplier |
|---|---|---|
| BINDZIL 2040 | Amorphous $SiO_2$ | Akzo Nobel |

TABLE 1(c)

Thickeners Can Be Used to Make the Aqueous Coating Compositions

| Chemical | Supplier |
|---|---|
| Acrysol TM RM-8W, HEUR type thickener | The Dow Chemical Company |
| Acrysol TM SCT-275, HEUR type thickener | The Dow Chemical Company |
| Acrysol TM ASE-60, ASE type thickener | The Dow Chemical Company |
| Acrysol TM RM-5, HASE type thickener | The Dow Chemical Company |

TABLE 1(c)-continued

Thickeners Can Be Used to Make the Aqueous Coating Compositions

| Chemical | Supplier |
|---|---|
| Acrysol TM RM-7, HASE type thickener | The Dow Chemical Company |
| Acrysol TM TT-615, HASE type thickener | The Dow Chemical Company |

TABLE 1(d)

Other Additives That Can Be Included

| Chemical | Supplier |
|---|---|
| Propylene Glycol, Freezing agent | Sinopharm Chemical Reagent Co., Ltd. |
| TRITON ™ EF-106, Wetting agent | The Dow Chemical Company |
| AMP-95, pH adjust agent | The Dow Chemical Company |
| Texanol, Coalescent | EASTMAN CHEMICAL COMPANY |
| LATEMUL ™ E-1000A, Surfactant | KAO CORPORATION |
| RHODAFAC ™ RS-610, Surfactant | The Rhodia Company |

Analytical Methods

The following test methods are used to analyze the inventive and comparative aqueous coating composition samples.

To measure the gloss level of a given aqueous coating composition sample, a coating composition sample is coated on an opacity card to form a 100 micron-thick wet film using a drawdown applicator. Then the coated substrate was allowed to be cured in the Consistent Temperature Room (CTR) overnight. The surface gloss of the dry clear coating at 60° geometry was measured according to the ASTM D523 method using a BYK-Gardner MICRO-TRI™ 20/60/85 Gloss Meter. As discussed above, for clear top coat compositions, the gloss level at 60° geometry should be no more than 20.

To measure the transparency level of a given aqueous coating composition sample, a transparency test was conducted. To measure the transparency of a given aqueous coating composition sample, a coating composition sample is coated on an opacity card to form a 100 micron-thick wet film using a drawdown applicator. Then the coated substrate was allowed to be cured in Consistent Temperature Room (CTR) overnight. A BYK Gardner Color-guide Sphere Spectrophotometer is used to evaluate the transparancy of the obtained coating film. For clear top coat compositions, the transparency value (L*) on black part should be no more than 30.

Sample Preparations

Preparation of the Single-Stage Aqueous Emulsion Polymer (Comparative Aqueous Emulsion Polymer A)

A monomer mixture was first prepared by mixing 397 grams of DI water, 31 grams of 20% E-1000A (surfactant), 6.9 grams of 25% RS-610 (surfactant), 13.04 grams of MAA, 734.6 grams of MMA, and 395.88 grams of 2-EHA. Thereafter, an additional 1000 grams of DI water and 115.3 grams of 20% E-1000A were added into a reactor. The reactor was then heated to 83° C.

Then, 43.64 grams of the monomer mixture, 1.38 grams of $Na_2CO_3$ mixed with 16.3 grams of DI water, 1.16 grams of ammonium persulfate (APS, initiator) in 25 grams of DI water were added into the reactor over a span of 5 minutes. The remaining monomer mixture and 1.16 grams of APS mixed in 62 grams of DI water were fed into the reactor over a span of 120 minutes. The mixture in the reactor was stirred for 10 minutes at 88° C. to allow the reactions to take place. 0.4 grams of t-BHP (initiator) mixed in 21 grams of DI water, and 0.23 grams of IAA mixed in 21 grams of DI water were gradually added into the reactor over a span of 30 minutes. Finally, the reactor was cooled to less than 50° C., while ammonium hydroxide solution was added to adjust the pH to about 7.5.

Preparation of Multi-Stage Aqueous Emulsion Polymer a (Inventive Aqueous Emulsion Polymer A)

Monomer Mixture 1 was prepared by slowly mixing 196 grams of DI water, 31 grams of 20% E-1000A, 13.97 grams of MAA, 280.38 grams of MMA, and 395.88 grams of 2-EHA. Monomer Mixture 2 was prepared in parallel by slowly mixing 115 grams of DI water, 6.9 grams of RS-610, 457.47 grams of MMA, and 4.62 grams of MAA.

A reactor was pre-heated to 83° C. under nitrogen purge. Thereafter, 1.38 grams of $Na_2CO_3$, 16.3 grams of DI water, 43.64 grams of Monomer Mixture 1, and 1.16 grams of APS mixed in 25 grams of DI water were added into reactor over a span of 5 minutes. Then, the remaining Monomer Mixture 1, along with 0.696 grams of APS mixed in 37 grams of DI water was slowly fed into the reactor over a span of 72 minutes. At the completion of addition of Monomer Mixture 1, the reaction was held at 88° C. for 5 minutes.

Monomer Mixture 2 was then fed into the reactor over a span of 48 minutes. Along with the introduction of Monomer Mixture 2, 0.46 grams of APS mixed with 25 grams of DI water was co-fed into the reactor. After adding Monomer Mixture 2 into the reactor, it was held and allowed to stir for 10 minutes for reactions to take place. Then, 0.4 grams of t-BHP mixed in with 21 grams of DI water, 0.23 grams of IAA mixed in 21 grams of DI water were gradually added into the reactor over a span of 30 minutes. The reactor was then cooled to less than 50° C., while ammonium hydroxide solution was added to adjust the pH to about 7.5.

As a result, the first polymer and the second polymer in the multi-stage Inventive Aqueous Emulsion Polymer A prepared using the above process has a 60/40 weight ratio, with the first polymer having an acid number of 13.08 and the second polymer having an acid number of 6.5.

Preparation of Multi-Stage Aqueous Emulsion Polymer B (Inventive Aqueous Emulsion Polymer B)

Monomer Mixture 1 was prepared by slowly mixing 196 grams of DI water, 31.0 grams of 20% E-1000A, 10.48 grams of MAA, 395.88 grams of 2-EHA, and 283.85 grams of MMA. Monomer Mixture 2 was prepared by slowly mixing 115 grams of DI water, 6.9 grams of 25% RS-610, 459.78 grams of MMA, and 2.31 grams of MAA. The subsequent steps for making Inventive Aqueous Emulsion Polymer B would be the same as making Inventive Aqueous Emulsion Polymer A above.

As a result, the first polymer and the second polymer in the multi-stage Inventive Aqueous Emulsion Polymer B prepared using the above process has a 60/40 weight ratio, with the first polymer having an acid number of 9.81 and the second polymer having an acid number of 3.27.

Preparation of Multi-Stage Aqueous Emulsion Polymer C (Inventive Aqueous Emulsion Polymer C)

Monomer Mixture 1 was prepared by slowly mixing 196 grams of DI water, 31.0 grams of 20% E-1000A, 13.98 grams of MAA, 395.88 grams of 2-EHA, and 280.38 grams of MMA. Monomer Mixture 2 was prepared by slowly mixing 115 grams of DI water, 6.9 grams of 25% RS-610, 459.78 grams of MMA, and 2.31 grams of MAA. The subsequent steps for making Inventive Aqueous Emulsion Polymer C would be the same as making the Inventive Aqueous Emulsion Polymer A above.

As a result, the first polymer and the second polymer in the multi-stage Inventive Aqueous Emulsion Polymer C prepared using the above process has a 60/40 weight ratio, with the first polymer having an acid number of 13.08 and the second polymer having an acid number of 3.27.

Preparation of Multi-Stage Aqueous Emulsion Polymer D (Inventive Aqueous Emulsion Polymer D)

Monomer Mixture 1 was prepared by slowly mixing 228 grams of DI water, 36.17 grams of 20% E-1000A, 24.45 grams of MAA, 461.86 grams of 2-EHA, and 319.02 grams of MMA. Monomer Mixture 2 was prepared by slowly mixing 87.0 grams of DI water, 5.18 grams of 25% RS-610, 345.88 grams of MMA, and 0.69 grams of MAA. The subsequent steps for making Inventive Aqueous Emulsion Polymer D would be the same as making Inventive Aqueous Emulsion Polymer A above.

As a result, the first polymer and the second polymer in the multi-stage Inventive Aqueous Emulsion Polymer A prepared using the above process has a 70/30 weight ratio, with the first polymer having an acid number of 19.62 and the second polymer having an acid number of 1.31.

Preparation of Multi-Stage Aqueous Emulsion Polymer E (Inventive Aqueous Emulsion Polymer E)

Monomer Mixture 1 was prepared by slowly mixing 310 grams of DI water, 41.5 grams of 20% E-1000A, 27.95 grams of MAA, 527.84 grams of 2-EHA, and 364.59 grams of MMA. Monomer Mixture 2 was prepared by slowly mixing 81.0 grams of DI water, 3.45 grams of 25% RS-610, 230.59 grams of MMA, and 0.46 grams of MAA. The subsequent steps for making Inventive Aqueous Emulsion Polymer E would be the same as making Inventive Aqueous Emulsion Polymer A above.

As a result, the first polymer and the second polymer in the multi-stage Inventive Aqueous Emulsion Polymer E prepared using the above process has an 80/20 weight ratio, with the first polymer having an acid number of 19.62 and the second polymer having an acid number of 1.31.

Preparation of Multi-Stage Aqueous Emulsion Polymer F (Inventive Aqueous Emulsion Polymer F)

Monomer Mixture 1 was prepared by slowly mixing 196 grams of DI water, 31.0 grams of 20% E-1000A, 20.96 grams of MAA, 390.98 grams of 2-EHA, and 273.4 grams of MMA. Monomer Mixture 2 was prepared by slowly mixing 115.0 grams of DI water, 6.9 grams of 25% RS-610, 360.23 grams of MMA, 102.07 grams of 2-EHA, and 0.92 grams of MAA. The subsequent steps for making Inventive Aqueous Emulsion Polymer F would be the same as making Inventive Aqueous Emulsion Polymer A above.

As a result, the first polymer and the second polymer in the multi-stage Inventive Aqueous Emulsion Polymer A prepared using the above process has a 60/40 weight ratio, with the first polymer having an acid number of 19.62 and the second polymer having an acid number of 1.31.

Preparation of Comparative Coating Composition a (Incorporating Comparative Single-Stage Comparative Aqueous Emulsion Polymer a, with Colloidal Silica and Thickeners)

Mix 20 grams of propylene glycol, 3 grams TRITON™ EF-106, and 481.5 grams of DI water for 5 minutes. Then, charge 332 grams of Comparative Polymer A and 125 grams of BINDZIL 2040, and continues to mix for 10 minutes. Finally, charge 12 grams of Texanol, 24 grams of ASE-60, and 2.5 grams of AMP-95, and mix for 10 minutes.

Preparation of all Other Inventive and Comparative Coating Compositions

The processes of preparing all other inventive and comparative coating compositions, for the purpose of demonstrating advantages of present invention (as show below in the Results section) are substantially similar to the process of preparing the Comparative Coating Composition A described above, except that the type and amount of aqueous emulsion, colloidal silica, and thickener were altered.

Summary of all Coating Compositions Analyzed

For purpose of demonstrating the superior properties of the aqueous coating compositions embodying the present invention, numerous coating samples with various combinations of key ingredients have been prepared and analyzed. Table 2 below lists these comparative and inventive aqueous coating compositions.

First, a comparison was made between coating compositions prepared using single-stage aqueous emulsion polymers and those prepared using multi-stage aqueous emulsion polymers. In particular, Comparative Coating Composition A was made with a single-stage aqueous emulsion polymer, anionic colloidal silica, and an alkali-based thickener; whereas Inventive Coating Compositions A-F were made using multi-stage aqueous emulsion polymers, anionic colloidal silica, and alkali-based thickeners.

Second, a comparison was made between coating compositions prepared using alkali-based thickeners (ASE and HASE thickeners) and those made from non-alkali-based thickeners, such as hydrophobically modified ethylene oxide urethane ("HEUR" or cellulose ethers ("HEC") thickeners. In particular, Inventive Coating Compositions G-I were made using multi-stage aqueous emulsion polymers, colloidal silica, and HASE thickeners. On the other hand, Comparative Coating Compositions B and C were made using multi-stage aqueous emulsion polymers, colloidal silica, and HUER thickeners. Comparative Coating Composition D was made with multi-stage aqueous emulsion polymers, colloidal silica, but no thickener at all.

Finally, a comparison was made between coating compositions made using different amounts of colloidal silica. In particular, Comparative Coating Compositions E, F, G, H were made with approximately 0, 10, 50, and 60 wt. % of colloidal silica based on the solid weight of aqueous coating compositions, respectively. On the other hand, Inventive Coating Compositions J and K were made with approximately 15 and 40 wt. % of colloidal silica based on the solid weight of aqueous coating compositions, respectively.

TABLE 2

List of Coating Compositions Analyzed

|  | Aqueous Emulsion Polymer Used | | Colloidal silica (BINDZIOL) | Thickener Used | |
| --- | --- | --- | --- | --- | --- |
|  | Type | Amount | Amount | Type | Amount |
| Comparative Coating Composition A | Comparative Aqueous Emulsion Polymer A | 332 g | 125 g | ASE-60 | 24 g |
| Inventive Coating Composition A | Inventive Aqueous Emulsion Polymer A | 300 g | 125 g | ASE-60 | 24 g |

TABLE 2-continued

List of Coating Compositions Analyzed

| | Aqueous Emulsion Polymer Used | | Colloidal silica (BINDZIOL) | Thickener Used | |
|---|---|---|---|---|---|
| | Type | Amount | Amount | Type | Amount |
| Inventive Coating Composition B | Inventive Aqueous Emulsion Polymer B | 300 g | 125 g | ASE-60 | 24 g |
| Inventive Coating Composition C | Inventive Aqueous Emulsion Polymer C | 300 g | 125 g | ASE-60 | 24 g |
| Inventive Coating Composition D | Inventive Aqueous Emulsion Polymer D | 300 g | 125 g | ASE-60 | 24 g |
| Inventive Coating Composition E | Inventive Aqueous Emulsion Polymer E | 300 g | 125 g | ASE-60 | 24 g |
| Inventive Coating Composition F | Inventive Aqueous Emulsion Polymer F | 300 g | 125 g | ASE-60 | 24 g |
| Inventive Coating Composition G | Inventive Aqueous Emulsion Polymer D | 300 g | 125 g | RM-7 | 15.3 g |
| Inventive Coating Composition H | Inventive Aqueous Emulsion Polymer D | 300 g | 125 g | RM-5 | 25.5 g |
| Inventive Coating Composition I | Inventive Aqueous Emulsion Polymer D | 300 g | 125 g | TT-615 | 10.9 g |
| Comparative Coating Composition B | Inventive Aqueous Emulsion Polymer D | 300 g | 125 g | RM-8W | 8.96 g |
| Comparative Coating Composition C | Inventive Aqueous Emulsion Polymer D | 300 g | 125 g | SCT-275 | 10.9 g |
| Comparative Coating Composition D | Inventive Aqueous Emulsion Polymer D | 300 g | 125 g | No thickener | 0 g |
| Inventive Coating Composition J | Inventive Aqueous Emulsion Polymer D | 360 g | 65 g | ASE-60 | 24 g |
| Inventive Coating Composition K | Inventive Aqueous Emulsion Polymer D | 255 g | 170 g | ASE-60 | 24 g |
| Comparative Coating Composition E | Inventive Aqueous Emulsion Polymer D | 425 g | 0 | ASE-60 | 24 g |
| Comparative Coating Composition F | Inventive Aqueous Emulsion Polymer D | 382.5 g | 42.5 g | ASE-60 | 24 g |
| Comparative Coating Composition G | Inventive Aqueous Emulsion Polymer D | 212.5 g | 212.5 g | ASE-60 | 24 g |
| Comparative Coating Composition H | Inventive Aqueous Emulsion Polymer D | 170 g | 255 g | ASE-60 | 24 g |

Analytical Results
Effect of High Molecular Weight Multi-Stage Aqueous Emulsion Polymers Table 3 below compares the gloss levels and physical stabilities between the Comparative Coating Composition A (made with single-stage Comparative Aqueous Emulsion Polymer A) and the Inventive Coating Compositions A-F (made with high molecular weight multi-stage Inventive Aqueous Emulsion Polymers A-F). Aqueous coating compositions were placed in an oven set at the temperature of 50° C. for 10 days. Thereafter, the samples were visually examined for presence of layers as result of silica particle precipitations, as well as measured for gloss level.

TABLE 3

Comparison of Coating Compositions Made With Single-Stage Emulsion Polymers and Coating Compositions Made With Multi-Stage Emulsion Polymers

| | Example ID | | | | | | |
|---|---|---|---|---|---|---|---|
| | Comparative Coating Composition A | Inventive Coating Composition A | Inventive Coating Composition B | Inventive Coating Composition C | Inventive Coating Composition D | Inventive Coating Composition E | Inventive Coating Composition F |
| Layers Observed | Yes | No | No | No | No | No | No |
| | Gloss level | | | | | | |
| Gloss measured at 60° angle | 4.5 | 5.7 | 9.5 | 7 | 4.1 | 4 | 5.5 |

Table 3 shows that, after 10 days of heat-age at 50° C., all inventive and comparative samples showed acceptable low gloss levels (i.e., less than 10 measured at 60° angle). However, in the Comparative Coating Composition A, as a result of silica particle precipitation, layers of silica particle deposits were observed in the cross section areas of the sample. On the other hand, no silica precipitation layers were observed in Inventive Coating Compositions A-F.

Therefore, experimental results show that aqueous coating compositions made with multi-stage emulsion polymers in accordance to the present invention have superior physical stability.

Effect of Different Thickeners Used in Aqueous Coating Compositions

Table 4 below compares the gloss levels between Inventive Coating Compositions D (made with an ASE thickener), Inventive Coating Compositions G-I (made with HASE thickeners), and Comparative Coating Compositions B and C (made with HEUR and HEC thickeners, respectively). Comparative Coating Composition D was made without any thickener.

those coating compositions that were made using alkaline-based thickeners (Inventive Coating Compositions D, G-H) demonstrate far lower gloss levels than those coating compositions made using non-alkaline based thickeners (Comparative Coating Compositions B and C), or the coating composition made without any thickener (Comparative Coating Compositions D). Also, silica settlement layers were observed in Comparative Coating Compositions B and C made using non-alkaline based thickeners.

Therefore, experimental results show that even if aqueous coating compositions were made with multi-stage aqueous emulsion polymers in accordance to the present invention, those that included alkali-based thickeners (such as ASE and HASE) have lower gloss level, as well as better physical stability.

Optimal Amount of Colloidal Silica to be Used in Coating Compositions

Although it has been demonstrated that inclusion of colloidal silica generally reduces the gloss level in coating compositions, through a series of experimentations, the inventors have determined the optimal range for the amount of colloidal silica to be added to the coating composition.

TABLE 4

Properties of Top Coat Compositions Using ASE-Type of Thickeners

| | Example ID | | | | | | |
|---|---|---|---|---|---|---|---|
| | Inventive Coating Composition D | Inventive Coating Composition G | Inventive Coating Composition H | Inventive Coating Composition I | Comparative Coating Composition B | Comparative Coating Composition C | Comparative Coating Composition D |
| | Heat-age stability | | | | | | |
| Initial KU | 70 | 86 | 56 | 130 | 58 | 70 | 40 |
| Heat-age KU | 74 | 90 | 60 | 132 | / | / | 40 |
| Layers observed | No | No | No | No | Yes | Yes | No |
| | Gloss Level | | | | | | |
| 60° | 4.1 | 6.3 | 4.1 | 17.4 | 84.4 | 61.4 | 88.6 |

Table 4 shows that, even for coating compositions that were made with multi-stage aqueous emulsion polymers,

TABLE 5

Coating Compositions Using Different Amounts of Colloidal Silica

| | Example ID | | | | | | |
|---|---|---|---|---|---|---|---|
| | Comparative Coating Composition E | Comparative Coating Composition F | Inventive Coating Composition J | Inventive Coating Composition D | Inventive Coating Composition K | Comparative Coating Composition G | Comparative Coating Composition H |
| Initial KU | 74 | 75 | 63 | 69 | 62 | 58 | 56 |
| Heat-age KU | 72 | 76 | 66 | 65 | 65 | 62 | 59 |
| layer/settle | No | No | No | No | No | No | No |
| | Properties of coating film | | | | | | |
| 60° | 44.11 | 23.6 | 19.3 | 4.1 | 2.3 | 1.8 | 1.4 |
| L* | 24.88 | 25.35 | 25 | 25.9 | 27.43 | 32.04 | 36.24 |
| | Amount of colloidal silica (wt. %) | | | | | | |
| | 0% | 10% | 15% | 30% | 40% | 50% | 60% |

Table 5 above shows that Comparative Coating Compositions E and F (both made using multi-stage aqueous emulsion polymers and ASE thickeners), showed a high gloss level because little to no colloidal silica were added. On the other hand, Comparative Coating Compositions G and H showed poor transparency levels (L* values being over 30 on opacity card) because too much colloidal silica were added. Therefore, certain embodiments of the present invention show that the optimal weight range for the amount of colloidal silica is from about 15 to 49 wt. %, based on the solid weight of aqueous coating composition.

What is claimed is:

1. An aqueous coating composition comprising,
   (a) a multi-stage aqueous emulsion polymer comprising:
     from 20% to 80% by weight, based on dry weight of the multi-stage aqueous emulsion polymer, of a first polymer having an acid number of from 9 to 33, said first polymer having a calculated Mn of from 50,000 to 1,000,000; and
     from 80% to 20% by weight, based on dry weight of the multi-stage aqueous emulsion polymer, of a second polymer having an acid number of from 0 to 7, said second polymer having a calculated Mn of from 50,000 to 1,000,000;
   (b) an anionic colloidal silica; and
   (c) an alkali-based thickener,
   wherein the aqueous coating composition is characterized in that a coating made from the aqueous coating composition has a gloss number of 20 or less on 60° Gardner Gloss scale, and a transparency level of L* of less than or equal to 30 measured on a BYK Gardner Color-guide Sphere Spectrophotometer.

2. The aqueous coating composition of claim 1, wherein the multi-stage aqueous emulsion polymer is present in an amount from 46% to 85% by weight, based on solid weight of the aqueous coating composition.

3. The aqueous coating composition of claim 1, wherein the first polymer has an acid number of from 13 to 26.

4. The aqueous coating composition of claim 1, wherein the second polymer has an acid number of from 0 to 5.

5. The aqueous coating composition of claim 1, wherein the first polymer of the multi-stage aqueous emulsion polymer has a glass transition temperature of from −36° C. to 50° C.

6. The aqueous coating composition of claim 1, wherein the second polymer of the multi-stage aqueous emulsion polymer has a glass transition temperature of from 30° C. to 100° c.

7. The aqueous coating composition of claim 1, wherein the multistage emulsion polymer has a silane coupling agent from 0.1 to 5% by weight, based on solid weight of the aqueous coating composition.

8. The aqueous coating composition of claim 1, wherein the anionic colloidal silica is present in an amount from 15% to 49% by weight, based on solid weight of the aqueous coating composition.

9. The aqueous coating composition of claim 1, wherein the anionic colloidal silica has a pH value of greater than 8.5.

10. The aqueous coating composition of claim 1, wherein the alkali-based thickener is an alkali swellable emulsion.

11. The aqueous coating composition of claim 1, wherein the alkali-based thickener is an hydrophobically modified alkali swellable emulsion.

12. The aqueous coating composition of claim 1, wherein the thickener is present in an amount of from 1% to 5% by weight, based on solid weight of the aqueous coating composition.

13. A method for providing a coating comprising,
   (a) forming an aqueous coating composition comprising
     (1) mufti-stage aqueous emulsion polymer comprising:
     from 20% to 80% by weight, based on dry weight of the multi-stage aqueous emulsion polymer, of a first polymer having an acid number of from 9 to 33, said first polymer having a calculated Mn of from 50,000 to 1,000,000; and
     from 80% to 20% by weight, based on dry weight of the multi-stage aqueous emulsion polymer, of a second polymer having an acid number of from 0 to 7,
     said second polymer having a calculated Mn of from 50,000 to 1,000,000; (2) an anionic colloidal silica; and (3) an alkali-based thickener;
   (b) applying the aqueous coating composition to a substrate; and
   (c) drying, or allowing to dry, said applied aqueous coating composition wherein the coating has a gloss number of 20 or less on 60° Gardner Gloss scale, and a transparency level of L* of less than or equal to 30 measured on a BYK Gardner Color-guide Sphere Spectrophotometer.

* * * * *